(12) United States Patent
Yamauchi et al.

(10) Patent No.: US 8,999,603 B2
(45) Date of Patent: Apr. 7, 2015

(54) GAS DIFFUSION LAYER FOR FUEL CELL, MANUFACTURING METHOD THEREFOR, MEMBRANE ELECTRODE ASSEMBLY, AND FUEL CELL

(75) Inventors: Masaki Yamauchi, Osaka (JP); Yoichiro Tsuji, Osaka (JP)

(73) Assignee: Panasonic Corporation, Osaka (JP)

( * ) Notice: Subject to any disclaimer, the term of this patent is extended or adjusted under 35 U.S.C. 154(b) by 947 days.

(21) Appl. No.: 13/125,834

(22) PCT Filed: Oct. 29, 2009

(86) PCT No.: PCT/JP2009/005740
§ 371 (c)(1),
(2), (4) Date: Apr. 25, 2011

(87) PCT Pub. No.: WO2010/050219
PCT Pub. Date: May 6, 2010

(65) Prior Publication Data
US 2011/0207025 A1      Aug. 25, 2011

(30) Foreign Application Priority Data

Oct. 31, 2008  (JP) .................................. 2008-281548
Oct. 31, 2008  (JP) .................................. 2008-281553

(51) Int. Cl.
*H01M 8/04*    (2006.01)
*H01M 8/00*    (2006.01)
*B28B 3/12*    (2006.01)
*H01M 8/10*    (2006.01)
*H01M 8/02*    (2006.01)

(52) U.S. Cl.
CPC .......... *H01M 8/1002* (2013.01); *H01M 8/0234* (2013.01); *H01M 8/0239* (2013.01); *H01M 8/0243* (2013.01); *H01M 2008/1095* (2013.01); *Y02E 60/521* (2013.01)

(58) Field of Classification Search
IPC ............. H01M 8/0402,8/0489, 8/1002, 8/2405, H01M 8/0234, 8/0239, 8/0243, 2008/1095; Y02E 60/521
See application file for complete search history.

(56) References Cited

U.S. PATENT DOCUMENTS

| | | | |
|---|---|---|---|
| 4,336,217 A | 6/1982 | Sauer | |
| 6,194,094 B1 | 2/2001 | Sugawara et al. | |
| 2002/0068215 A1 | 6/2002 | Hamada et al. | |
| 2002/0146616 A1* | 10/2002 | Yasuo et al. | 429/44 |

(Continued)

FOREIGN PATENT DOCUMENTS

| | | |
|---|---|---|
| CN | 1387682 | 12/2002 |
| CN | 1734812 | 2/2006 |

(Continued)

OTHER PUBLICATIONS

U.S. Office Action issued Nov. 25, 2013 in related U.S. Appl. No. 12/995,237.

(Continued)

*Primary Examiner* — Alix Eggerding
(74) *Attorney, Agent, or Firm* — Wenderoth, Lind & Ponack, L.L.P.

(57) ABSTRACT

A gas diffusion layer for fuel cell of the present invention is structured with a porous member mainly comprised of conductive particles such as acetylene black, graphite and a polymer resin such as PTFE. This makes it possible to achieve both an improvement in power generation performance of the fuel cell and a reduction in costs.

20 Claims, 6 Drawing Sheets

(56) References Cited

U.S. PATENT DOCUMENTS

| | | | |
|---|---|---|---|
| 2003/0175579 A1 | 9/2003 | Uchida et al. | |
| 2005/0100780 A1 | 5/2005 | Unoki et al. | |
| 2005/0173244 A1* | 8/2005 | Hayashi et al. | 204/282 |
| 2005/0233181 A1 | 10/2005 | Wariishi et al. | |
| 2007/0087261 A1* | 4/2007 | Endoh et al. | 429/44 |
| 2007/0099068 A1* | 5/2007 | Suzuki et al. | 429/42 |
| 2007/0202388 A1 | 8/2007 | Koehler et al. | |
| 2007/0218348 A1* | 9/2007 | Tanaka et al. | 429/44 |
| 2008/0131745 A1 | 6/2008 | Ikeda et al. | |
| 2009/0104476 A1 | 4/2009 | Ji et al. | |

FOREIGN PATENT DOCUMENTS

| | | |
|---|---|---|
| DE | 29 41 774 | 4/1981 |
| EP | 1 229 600 | 8/2002 |
| EP | 1 517 392 | 3/2005 |
| EP | 0 917 226 | 9/2006 |
| EP | 1 780 822 | 5/2007 |
| JP | 5-36419 | 2/1993 |
| JP | 9-245801 | 9/1997 |
| JP | 2001-57215 | 2/2001 |
| JP | 2002-170572 | 6/2002 |
| JP | 2003-187809 | 7/2003 |
| JP | 2003-197202 | 7/2003 |
| JP | 2005-197150 | 7/2005 |
| JP | 2007-12424 | 1/2007 |
| JP | 2007-141783 | 6/2007 |
| JP | 2007-242444 | 9/2007 |
| JP | 2009-076451 | 4/2009 |
| WO | 2005/043656 | 5/2005 |

OTHER PUBLICATIONS

Office Action issued on Mar. 4, 2013 in U.S. Appl. No. 12/995,237.
International Search Report issued Feb. 9, 2010 in International (PCT) Application No. PCT/JP2009/005740.
Supplementary European Search Report, issued Apr. 5, 2012 in EP Application 09 82 3332.3, which is a counterpart to the present application.
English translation of International Preliminary Report on Patentability and Written Opinion of the International Searching Authority, issued Jul. 7, 2011 in PCT/JP2009/005740.
International Search Report issued Feb. 9, 2010 in counterpart International (PCT) Application No. PCT/JP2009/005739.
Written Opinion of the International Searching Authority (in English) issued Feb. 9, 2010 in counterpart PCT/JP2009/005739.
English translation of International Preliminary Report on Patentability and Written Opinion of the International Searching Authority, issued Jun. 16, 2011 in counterpart PCT/JP2009/005739.
European Search Report, issued Apr. 5, 2012 in European application 09 82 3331.5, which is a counterpart to the present application.
Chinese Office Action, issued Oct. 29, 2012 in a Chinese application that is a foreign counterpart to the present application (with partial English translation).
European Office Action, issued Dec. 7, 2012 in an European application that is a foreign counterpart to the present application.
Chinese Office Action dated Jun. 18, 2014 issued in corresponding Chinese Application No. 200980142894.5. (with English translation).
Machine English translation of JP 2001-057215 (Feb. 27, 2001).
Machine English translation of JP 2007-141783 (Jun. 7, 2007).

* cited by examiner

GAS DIFFUSION LAYER FOR FUEL CELL, MANUFACTURING METHOD THEREFOR, MEMBRANE ELECTRODE ASSEMBLY, AND FUEL CELL

TECHNICAL FIELD

The present invention relates to a fuel cell, in which a liquid fuel such as pure hydrogen, methanol or the like, or a reducing agent such as reformed hydrogen obtained from a fossil fuel, is used as a fuel gas, and air (oxygen) is used as an oxidant gas. In particular, the present invention relates to a gas diffusion layer included in a membrane electrode assembly used for the fuel cell, and a manufacturing method thereof.

BACKGROUND ART

A fuel cell, for example a polymer electrolyte fuel cell, is an apparatus that allows a fuel gas containing hydrogen and an oxidant gas containing oxygen such as air to electrochemically react with each other at a gas diffusion layer that has a catalyst layer such as platinum, such that electric power and heat are produced at the same time.

FIG. 7 is a schematic diagram showing the basic structure of a conventional polymer electrolyte fuel cell. A single cell (also referred to as a cell) 100 of the polymer electrolyte fuel cell includes a membrane electrode assembly 110 (hereinafter referred to as the MEA: Membrane-Electrode-Assembly) and paired plate-like conductive separator 120 disposed on opposite faces of the MEA 110, respectively.

The MEA 110 includes a polymer electrolyte membrane (a resin ion exchange membrane) 111 that selectively transports hydrogen ions, and paired electrode layers 112 formed at the opposite faces of the polymer electrolyte membrane 111. The paired electrode layers 112 are formed at the opposite faces of the polymer electrolyte membrane 111, and each includes a catalyst layer 113 which is mainly comprised of carbon powder bearing a platinum metal catalyst, and a gas diffusion layer 119 (also referred to as a GDL) that is formed on the catalyst layer 113 and that has combination of features of current-collecting function, gas permeability, and water repellency. The gas diffusion layer 119 is structured with a base member 115 made of carbon fibers, and a coating layer (a water-repellent carbon layer) 116 structured with carbon and a water-repellent member.

The paired separators 120 are provided with, at their main surfaces abutting on the gas diffusion layers 119, respectively, fuel gas flow passage grooves 121 for allowing the fuel gas to flow through, and oxidant gas flow passage grooves 122 for allowing the oxidant gas to flow through. Further, the paired separators 120 are provided with coolant flow passage grooves 123 through which coolant or the like passes. Supply of the fuel gas and the oxidant gas to the paired electrode layers 112 through the gas flow passage grooves 121 and 122, respectively, causes an electrochemical reaction, to produce electric power and heat.

As shown in FIG. 7, the cell 100 structured as described above is generally used by being stacked by one piece or more, so that the cells 100 adjacent to each other are electrically connected in series. It is noted that, here, the cells 100 stacked together are fastened under pressure at a prescribed fastening pressure by fastening members 130 such as bolts, so as to prevent leakage of the fuel gas and the oxidant gas and to reduce the contact resistance. Accordingly, each of the MEAs 110 and each of the separators 120 are brought into plane-to-plane contact at a prescribed pressure. Further, in order to prevent the gases required for the electrochemical reaction from leaking externally, a sealing member (gasket) 117 is disposed between the separators 120 and 120 so as to cover the side surface of the catalyst layer 113 and that of the gas diffusion layer 114.

In connection with the polymer electrolyte fuel cell structured as described above, the gas diffusion layers 114 of a variety of structures are known. For example, Patent Document 1 discloses a gas diffusion layer similar to the conventional gas diffusion layer 114 described above, in which a coating layer (a water-repellent, carbon layer, a C layer) made up of a carbon material and a water-repellent member is provided on the surface of a base member (for example, paper, woven fabric, or nonwoven fabric) made of carbon fibers. Further, Patent Documents 2 and 3 each disclose a gas diffusion layer which does not employ carbon fibers as the base member. The gas diffusion layer of Patent Document 2 is structured by having a mesh sheet processed with a water-repellent material, and having the void portions of the mesh sheet filled with a paste made up of carbon and a water-repellent member. The gas diffusion layer of Patent Document 3 is structured with a mixture of graphite, carbon black, uncalcined PTFE (polytetrafluoroethylene), and calcined PTFE.

PRIOR ART DOCUMENTS

Patent Documents

Patent Document 1: Japanese Unexamined Patent Publication No. 2003-197202
Patent Document 2: Japanese Unexamined Patent Publication No. 2002-170572
Patent Document 3: Japanese Unexamined Patent Publication No. 2003-187809

SUMMARY OF THE INVENTION

Subject to be Solved by the Invention

In recent years, for the purpose of improving the efficiency of the fuel cell, an attempt has been made to generate power at a higher temperature than in a conventional manner, to raise the heat recovery temperature. Further, in order to reduce the devices in a system, an attempt has been made to reduce the humidification amount supplied to an electrode layer of the fuel cell than in a conventional manner (low-humidity drive).

In a case of such high-temperature and low-humidity drive, with the structure of Patent Document 1, the base member of the carbon fiber normally exhibits high porosity of 80% or more. Accordingly, it suffers from an issue that the inside of the electrode layer becomes dry due to gas diffusion, increasing the resistance in relation to proton conductivity of the polymer electrolyte membrane, whereby the voltage drops. Further, because the carbon fiber base member is expensive, it is difficult to reduce the cost of the electrode layer.

Further, with the structure of the embodiment of Patent Document 2, because a mesh sheet is used as the structure body in order to secure strength, it suffers from an issue of an increase in the material cost and complication of the manufacturing process. Still further, because a metal mesh is used as the mesh sheet in the structure of the embodiment of Patent Document 2, metal powder of the metal mesh may attach to the electrode layer, which may invite deterioration of the polymer electrolyte membrane, impairing durability of the fuel cell. Still further, with the structure of the embodiment of Patent Document 2, the mix ratio between the carbon material and PTFE is 7:3 or 6:4, i.e., the mix ratio of PTFE is relatively high. Because PTFE is an insulator, the high mix ratio of PTFE fails to achieve sufficient electric conductivity, whereby the power generation performance may be impaired. Further, also in a case where an insulator such as ceramic or engineering plastic is used as a mesh sheet, sufficient electric conductivity may not be achieved, and the power generation performance may be impaired.

Further, with the structure of Patent Document 3, because no carbon fibers or mesh sheet are used as the base member, a reduction in cost of the electrode layer can be achieved. However, with the structure of Patent Document 3, in order to secure the strength enough to be used as a gas diffusion layer, it must cope with the problem of an increased amount of the mix amount of PTFE serving as the binder (e.g., 30 weight percent or more). Accordingly, it may fail to achieve sufficient electric conductivity, and the power generation performance may be impaired.

Accordingly, an object of the present invention is to solve the issues described above, and to provide a gas diffusion layer for fuel cell that can realize both an improvement in the power generation performance and a reduction in costs of a fuel cell, a manufacturing method thereof, a membrane electrode assembly including the gas diffusion layer, and a fuel cell.

Means for Solving the Subject

The inventors of the present invention have devoted themselves to solving the issues that the conventional techniques face, to find that high power generation performance can be achieved even under low-humidity drive, by structuring a gas diffusion layer for fuel cell with a porous member mainly comprised of conductive particles and a polymer resin, and arrived at the present invention.

In order to achieve the foregoing object, the present invention is provided with the following arrangements.

According to a first aspect of the present invention, there is provided a gas diffusion layer used for a fuel cell, wherein the gas diffusion layer is structured with a porous member mainly comprised of conductive particles and a polymer resin.

As used herein, "a porous member mainly comprised of conductive particles and a polymer resin" refers to a porous member having a structure supported just by the conductive particles and the polymer resin, without use of carbon fibers as the base member (what is called a self-supporting structure). In a case where the porous member is manufactured with conductive particles and a polymer resin, as will be described later, a surfactant and a dispersing solvent are used, for example. In this case, while the surfactant and the dispersing solvent are removed by calcination in the course of manufacturing steps, the surfactant and the dispersing solvent may possibly fail to be removed, and remain in the porous member. Accordingly, the term "a porous member mainly comprised of conductive particles and a polymer resin" means a porous member that may contain such remained surfactant and dispersing solvent, so long as the structure can be supported just by the conductive particles and the polymer resin. Further, this also means that the porous member may contain materials other than the conductive particles, the polymer resin, the surfactant, and the dispersing solvent, (for example, short carbon fibers or the like), so long as they fall within a range with which the object of the present invention can be achieved.

According to a second aspect of the present invention, there is provided the gas diffusion layer according to the first aspect, wherein the gas diffusion layer is structured with the porous member mainly comprised of the conductive particles and the polymer resin, with carbon fibers added by a weight smaller than a weight of the polymer resin.

According to a third aspect of the present invention, there is provided the gas diffusion layer according to the second aspect, wherein the porous member includes the carbon fibers by 2.0 weight percent or more and 7.5 weight percent or less.

According to a fourth aspect of the present invention, there is provided the gas diffusion layer according to any one of the second and third aspects, wherein the porous member includes the polymer resin by 10 weight percent or more and 17 weight percent or less.

According to a fifth aspect of the present invention, there is provided the gas diffusion layer according to any one of the second to fourth aspects, wherein the carbon fibers is one of vapor grown carbon fibers, milled fibers, cut fibers, and chopped fibers.

According to a sixth aspect of the present invention, there is provided the gas diffusion layer according to any one of the first to fifth aspects, wherein a porosity of the porous member is 42% or more and 60% or less.

According to a seventh aspect of the present invention, there is provided the gas diffusion layer according to any one of the first to sixth aspects, wherein the conductive particles are structured with two types of carbon materials differing in average particle size from each other.

According to an eighth aspect of the present invention, there is provided the gas diffusion layer according to the seventh aspect, wherein a mix ratio between the carbon material whose average particle size is small and the carbon material whose average particle size is great is 1:0.7 to 1:2.

According to a ninth aspect of the present invention, there is provided the gas diffusion layer according to any one of the first to eighth aspects, wherein a thickness of the porous member is 150 µm or more and 600 µm or less.

According to a 10th aspect of the present invention, there is provided the gas diffusion layer according to the ninth aspect, wherein the thickness of the porous member is 300 µm or more and 600 µm or less.

According to an 11th aspect of the present invention, there is provided a membrane electrode assembly comprising the gas diffusion layer according to any one of the first to 10th aspects.

According to a 12th aspect of the present invention, there is provided a fuel cell comprising the gas diffusion layer according to any one of the first to 10th aspects.

According to a 13th aspect of the present invention, there is provided a manufacturing method of a gas diffusion layer used for a fuel cell, comprising:

mixing conductive particles, a polymer resin, a surfactant, and a dispersing solvent;

rolling a mixture obtained by the mixing to mold the mixture to be sheet-like;

calcining the sheet-like molded mixture to remove the surfactant and the dispersing solvent from the mixture; and re-rolling the mixture from which the surfactant and the dispersing solvent are removed to adjust thickness of the mixture.

According to a 14th aspect of the present invention, there is provided the manufacturing method of a gas diffusion layer according to the 13th aspect, wherein the mixing is performed for mixing the conductive particles, the polymer resin, carbon fibers, the surfactant, and the dispersing solvent.

According to a 15th aspect of the present invention, there is provided the manufacturing method of a gas diffusion layer according to the 14th aspects, wherein a mix ratio of the carbon fibers in the mixture having the thickness adjusted by the re-rolling is 2.0 weight percent or more and 7.5 weight percent or less.

According to a 16th aspect of the present invention, there is provided the manufacturing method of a gas diffusion layer according to any one of the 14th and 15th aspects, wherein a mix ratio of the polymer resin in the mixture having the thickness adjusted by the re-rolling is 10 weight percent or more and 17 weight percent or less.

According to a 17th aspect of the present invention, there is provided the manufacturing method of a gas diffusion layer according to any one of the 14th to 16th aspects, wherein one of vapor grown carbon fibers, milled fibers, cut fibers, and chopped fibers is used as the carbon fibers.

According to an 18th aspect of the present invention, there is provided the manufacturing method of a gas diffusion layer according to any one of the 13th to 17th aspects, wherein a porosity of the mixture having the thickness adjusted by the re-rolling is 42% or more and 60% or less.

According to a 19th aspect of the present invention, there is provided the manufacturing method of a gas diffusion layer according to any one of the 13th to 18th aspects, wherein two types of carbon materials differing in average particle size from each other are used as the conductive particles.

According to a 20th aspect of the present invention, there is provided the manufacturing method of a gas diffusion layer according to the 19th, wherein a mix ratio between the carbon material whose average particle size is small and the carbon material whose average particle size is great is 1:0.7 to 1:2.

According to a 21st aspect of the present invention, there is provided the manufacturing method of a gas diffusion layer according to one of the 13th to 20th aspects, wherein the thickness of the mixture of 150 µm or more and 600 µm or less is achieved in the re-rolling the mixture from which the surfactant and the dispersing solvent are removed so as to adjust the thickness.

According to a 22nd aspect of the present invention, there is provided the manufacturing method of a gas diffusion layer according to the 21st aspect, wherein the thickness of the mixture of 300 µm or more and 600 µm or less is achieved in the re-rolling the mixture from which the surfactant and the dispersing solvent are removed so as to adjust the thickness.

According to a 23rd aspect of the present invention, there is provided a gas diffusion layer, manufactured through the manufacturing method according to any one of the 13th to 22nd aspects.

Effects of the Invention

With the gas diffusion layer for fuel cell according to the first aspect of the present invention, because the gas diffusion layer is structured with the porous member mainly comprised of the conductive particles and the polymer resin, without the use of a carbon fiber base member, a reduction in costs of the fuel cell, can be achieved. Further, adjustment of the porosity or the thickness makes it possible to improve the power generation performance, which makes it possible to obtain a high voltage even under low-humidity drive.

With the gas diffusion layer according to the second aspect of the present invention, because it is structured with the porous member mainly comprised of the conductive particles and the polymer resin, with added carbon fibers by a weight smaller than a weight of the polymer resin, and without the use of a carbon fiber base member, a reduction in costs of the fuel cell can be achieved. Further, because such addition of carbon fibers can increase the strength as the gas diffusion layer, it becomes possible to reduce the mix amount of the polymer resin acting as a binder. This makes it possible to reduce the mix ratio of the polymer resin functioning as an insulator, whereby an improvement in the power generation performance can be achieved.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

In the following, with reference to the drawings, a description will be given of the preferred embodiments of the present invention. It is noted that, throughout the drawings referred to in the following, identical reference symbols are allotted to the identical or corresponding components, and description thereof will not be repeated.

First Embodiment

Figure 1:
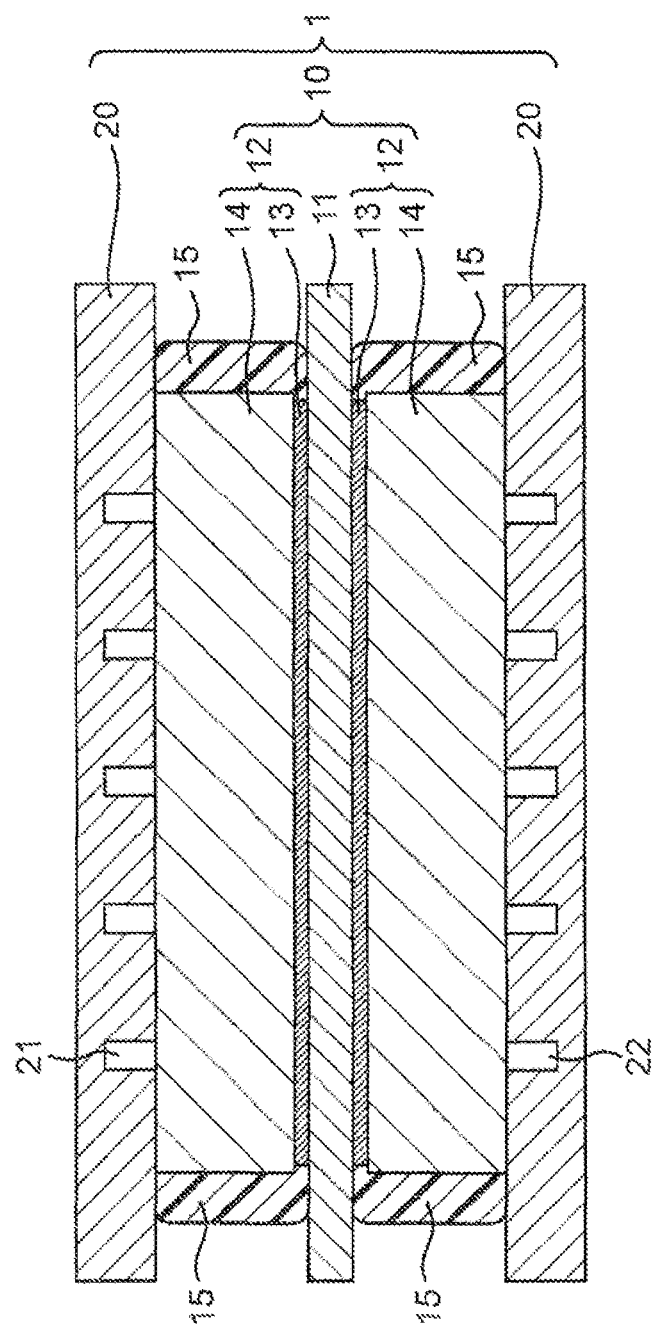
FIG. 1 is a cross-sectional view schematically showing the basic structure of a fuel cell according to a first embodiment of the present invention.

With reference to FIG. 1, a description will be given of the basic structure of a fuel cell according to a first embodiment of the present invention. FIG. 1 is a cross-sectional view showing the basic structure of the fuel cell according to the first embodiment. The fuel cell according to the first embodiment is a polymer electrolyte fuel cell that allows a fuel gas containing hydrogen and an oxidant gas containing oxygen such as air to electrochemically react with each other, to produce electric power and heat at the same time. It is noted that the present invention is not limited to such a polymer electrolyte fuel cell, but is applicable to various fuel cells.

As shown in FIG. 1, the fuel cell according to the first embodiment includes a cell 1 including a membrane electrode assembly 10 (hereinafter referred to as the MEA: Membrane-Electrode-Assembly) and paired plate-like conductive separators 20 and 20 disposed on opposite faces of the MEA 10. It is noted that the fuel cell according to the first embodiment may be structured by a stacked plurality of pieces of such cells 1. In this case, the cells 1 stacked together are preferably fastened under pressure at a prescribed fastening pressure by fastening members (not shown) such as bolts, so as to prevent leakage of the fuel gas and the oxidant gas and to reduce the contact resistance.

The MEA 10 includes a polymer electrolyte membrane 11 that selectively transports hydrogen ions, and paired electrode layers 12 formed at the opposite faces of the polymer electrolyte membrane 11, respectively. One of the paired electrode layers 12 is an anode electrode, while the other is a cathode electrode. The paired electrode layers 12 and 12 are formed at the opposite faces of the polymer electrolyte membrane 11, respectively, and each include a catalyst layer 13 mainly comprised of carbon powder bearing a platinum metal catalyst, and a gas diffusion layer 14 that is formed on the catalyst layer 13 and that has combination of features of current-collecting function, gas permeability, and water repellency.

Further, one of the paired separators 20 and 20 is provided with, at its main surface abutting on the gas diffusion layer 14 (the anode electrode side), fuel gas flow passage grooves 21 for allowing the fuel gas to flow through. The fuel gas flow passage grooves 21 are structured with, e.g., a plurality of grooves substantially parallel to one another. The other one of the paired separators 20 and 20 is provided with, at its main surface abutting on the gas diffusion layer 14 (the cathode electrode side), the oxidant gas flow passage grooves 22 for allowing the oxidant gas to flow through. The oxidant gas flow passage grooves 22 are structured with, e.g., a plurality of grooves substantially parallel to one another. It is noted that the paired separators 20 and 20 may be provided with coolant flow passage grooves (not shown) through which coolant or the like passes. Supply of the fuel gas and the oxidant gas to the paired electrode layers 12 and 12 through the gas flow passage grooves 21 and 22, respectively, causes an electrochemical reaction, to produce electric power and heat.

Further, in order to prevent the gases required for the electrochemical reaction from leaking externally, a sealing member (gasket) 15 is disposed between each separator 20 and the polymer electrolyte membrane 11, so as to cover the side surface of the catalyst layer 13 and that of the gas diffusion layer 19.

Next, a detailed description will be given of the structure of the gas diffusion layer 19 according to the first embodiment of the present invention.

The gas diffusion layer 14 is structured with a sheet-like and rubber-like porous member mainly comprised of conductive particles and a polymer resin.

Examples of materials of the conductive particles may be carbon materials such as graphite, carbon black, activated carbon and the like. The carbon black may include, acetylene black (AB), furnace black, Ketjen black, Vulcan and the like. Of these materials, use of acetylene black as the principal component of carbon black is preferable from the viewpoint of small impurity content and high electric conductivity. Further, exemplary materials of graphite may include natural graphite, artificial graphite and the like. Of these materials, use of artificial graphite as the principal component of graphite is preferable from the viewpoint of small impurity content.

Further, the conductive particles are preferably structured with a mixture of two types of carbon materials differing in average particle size. This makes it possible to reduce the porosity of the gas diffusion layer as a whole. The conductive particles with which a filled structure can be prepared with ease may be of graphite. Accordingly, the conductive particles are preferably structured by mixing acetylene black and graphite.

Figure 2:
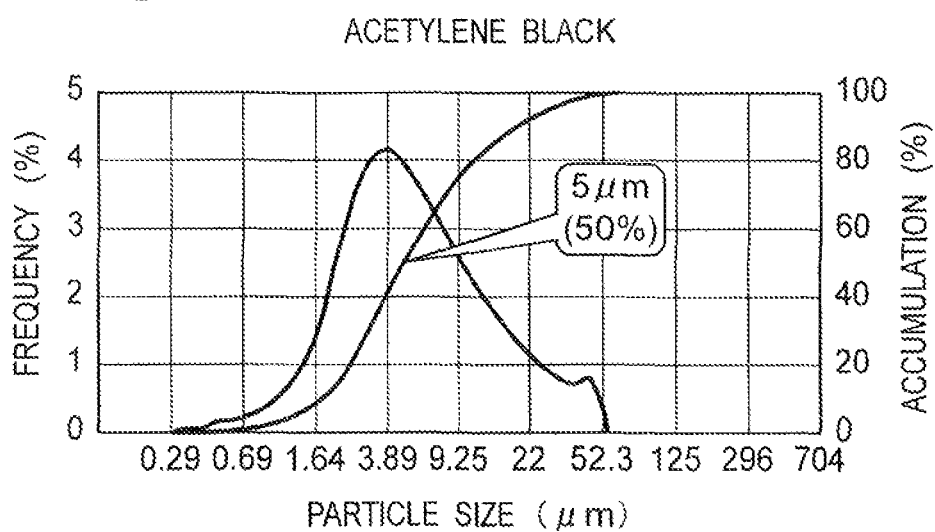
FIG. 2 is a graph showing the measurement result of the average particle size of acetylene black.
Figure 3:
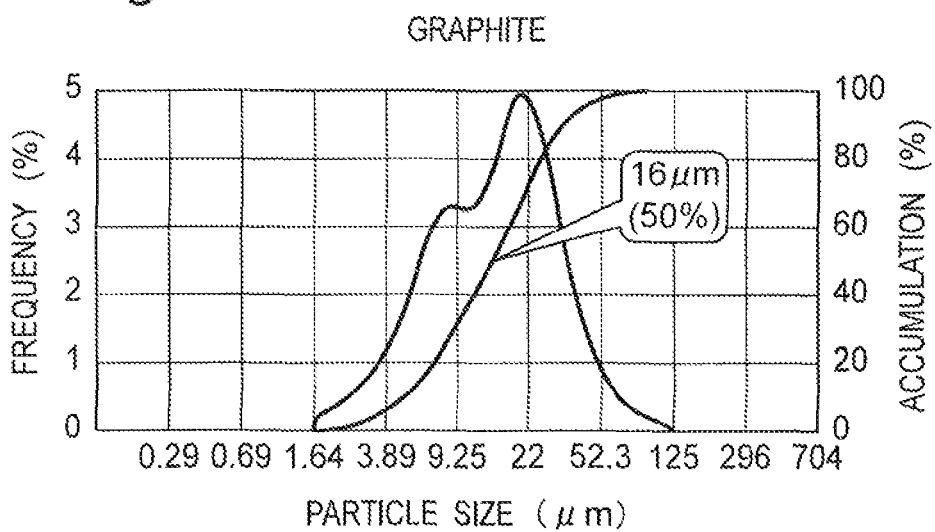
FIG. 3 is a graph showing the measurement result of the average particle size of graphite.
Figure 4:
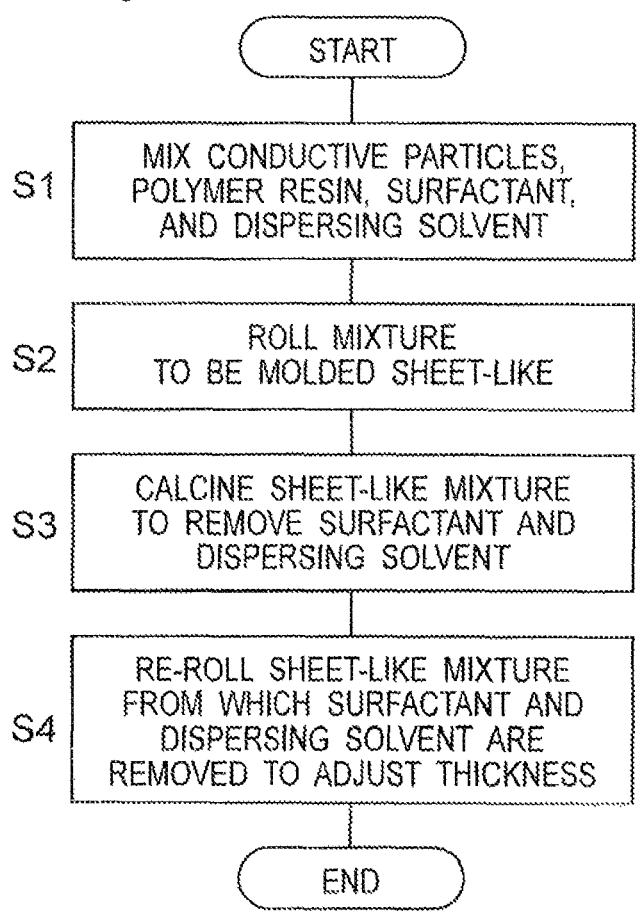
FIG. 4 is a flowchart showing a manufacturing method of a gas diffusion layer according to the first embodiment of the present invention.

Meanwhile, when the average particle size $D_{50}$ (particle size when the relative particle amount is 50%: also referred to as the median diameter) of acetylene black was measured through the use of the laser diffraction type particle size analyzer microtrac HRA, the result shown in FIG. 2, i.e., $D_{50}$=5 μm, was obtained. Further, in a manner similar to that with acetylene black, the particle size $D_{50}$ of graphite was measured, and the result shown in FIG. 3, i.e., $D_{50}$=16 μm, was obtained. Measurement of each average particle size was performed by dispersing particles of acetylene black or graphite in distilled water containing surfactant of 10 wt %, and at the time point where the particle size distribution has stabilized.

It is noted that, when the conductive particles is structured with a mixture of three or more types of carbon materials, it becomes difficult to optimize dispersing, mixing, rolling conditions and the like. Therefore, the conductive particles are preferably structured by mixing two types of carbon materials.

Further, the exemplary material form of the carbon material may include powder, fibrous, particulate and the like. Of these, it is preferable to adopt the powder form as the material form of the carbon material, from the viewpoint of dispersion and handleability.

Examples of the polymer resin may include PTFE (polytetrafluoroethylene), FEP (tetrafluoroethylene-hexafluoropropylene copolymer), PVDF (polyvinylidene fluoride), ETFE (tetrafluoroethylene-ethylene copolymer), PCTFE (polychlorotrifluoroethylene), PFA (tetrafluoroethylene-perfluoroalkyl vinyl ether copolymer) and the like. Of these, use of PTFE as the polymer resin is preferable in the viewpoint of heat resistance, water repellency, and chemical resistance. The material form of PTFE may include dispersion, powder and the like. Of these, it is preferable to adopt dispersion as the material form of PTFE, from the viewpoint of workability.

The polymer resin has a function as a binder for binding the conductive particles to one another. Further, because the polymer resin is water repellent, it also has a function of confining water in the system within the fuel cell (water retentivity).

Further, the gas diffusion layer 14 may contain, in addition to the conductive particles and the polymer resin, a trace of surfactant, dispersing solvent and the like which are used in manufacturing the gas diffusion layer 14. Examples of the dispersing solvent may include water, alcohols such as methanol, ethanol and the like, and glycols such as ethylene glycol and the like. Examples of the surfactant may include nonion based surfactant such as polyoxyethylene alkyl ether and amphoteric ion based surfactant such as alkyl amine oxide. The amount of the dispersing solvent and that of the surfactant used for manufacturing may be set as appropriate in accordance with the type of the conductive particles, the type of the polymer resin, the mix ratio between them and the like. It is noted that, generally, a greater amount of the dispersing solvent and that of the surfactant tend to promote uniform dispersion of the conductive particles and the polymer resin. On the other hand, they tend to increase the flowability, making it difficult to have the gas diffusion layer formed as a sheet. It is noted that the gas diffusion layer 14 may contain materials other than the conductive particles, the polymer resin, the surfactant, and the dispersing solvent (e.g., short carbon fibers) within a tolerable range for achieving the object of the present invention.

Next, with reference to FIG. 9, a description will be given of a manufacturing method of a gas diffusion layer 14 according to the first embodiment of the present invention.

First, in step S1, conductive particles, polymer resin, a surfactant, and a dispersing solvent are mixed (a mixing step). More specifically, a carbon material as the conductive particles, a surfactant, and a dispersing solvent are fed into an agitator/mixer and mixed, such that the carbon material is crushed and granulated. Thereafter, into the mixture, a polymer resin material is added and further dispersed. It is noted that, instead of feeding the carbon material and the polymer resin material into the mixer separately, all the materials may be fed into the mixer at once.

In step S2, the mixture obtained by mixing is rolled by a roll press machine, a flat plate press machine, or the like, to be molded into a sheet (a rolling step).

In step S3, the sheet-like molded mixture is calcined, to remove the surfactant and the dispersing solvent from the mixture (a calcining step).

In step S4, the mixture from which the surfactant and the dispersing solvent are removed is rolled again, to adjust the thickness (a re-rolling step).

In this manner, the gas diffusion layer 14 according to the first embodiment of the present invention can be manufactured.

With the gas diffusion layer according to the first embodiment, because the gas diffusion layer is structured with the porous member mainly comprised of the conductive particles and the polymer resin without the use of a carbon fiber base member, a reduction in the costs of the fuel cell can be achieved. Further, by adjusting the porosity or the thickness, it becomes possible to improve the power generation performance, whereby a high voltage can be obtained even under the low-humidity drive.

It is noted that, the present invention is not limited to the first embodiment, and can be practiced in various modes. For example, the gas diffusion layer 14 of a sheet-like shape may continuously be formed (roll-to-roll) using a roll press machine. In this case, while the roll diameter, the roll width, and the surface precision of the roll press machine can be set as appropriate, a greater roll diameter can further uniformly disperse the pressure applied onto the gas diffusion layer 19. Further, a higher surface precision can further reduce variations in thickness of the gas diffusion layer 14. Accordingly, use of a roll press machine whose roll diameter is great and whose surface precision is high is preferable.

Further, though it has been described that the mixture is heated after rolled, the mixture may be heated at the same time when rolled.

It is noted that, depending on the mixing time, the shape of the blade of the mixer, the capacity of the mixer, the feed amount of each of the materials, the mix amount of the dispersing solvent, the mix amount of the surfactant and the like, the stress (shear force) applied to the materials (in particular, the polymer resin material) changes, which affects sheet moldability and strength, in the following step. Generally, a greater shear force promotes the polymer resin to become fibrous to increase the bindingness of the conductive particles to one another, whereby the strength of the gas diffusion layer 14 improves. However, an excessively high shear force causes the mixture to be a hard ball-like, which necessitates application of an excessive pressure in molding into a sheet, which follows the mixing. Thus, manufacture of the gas diffusion layer becomes difficult.

Preferably, the calcining temperature and the calcining time are the temperature and the time required for the surfactant and the dispersing solvent to vaporize or decompose. It is noted that, an excessively high calcining temperature may melt the polymer resin to reduce the strength as the gas diffusion layer 14, whereby the sheet may possibly be deformed. Therefore, the calcining temperature is preferably equal to or lower than the melting point of the polymer resin (for example, in the case of PTFE, 330° C. to 350° C.). Further, the vaporizing or decomposition temperature of the surfactant can be measured based on an analysis result of, e.g., TG/DTA (thermogravimetry and differential thermal analysis apparatus) or the like, which generally measures 260° C. or more. Accordingly, the calcining temperature is preferably 260° C. or more. The calcining time may appropriately be set in accordance with the specification of the calcining furnace (such as its volume, air volume, air flow speed and the like), the number of calcined sheets and the like.

Further, the material of the surfactant may be selected as appropriate, in accordance with the type of the carbon materials and that of the dispersing solvent.

Further, though it has been described that the mixture mixed by the mixer is rolled by the roll press machine, the flat plate press machine or the like to be sheet-like shape, the present invention is not limited thereto. For example, it is also possible to manufacture by feeding the mixture into an extruder, to be continuously molded sheet-like from the die head of the extruder. Further, by elaborating the screw shape of the extruder to provide the screw with the mixing function, the mixture can be obtained without the necessity of using a mixer. That is, agitation, mixing, sheet molding of the carbon materials can integrally be performed with one machine.

Figure 5:
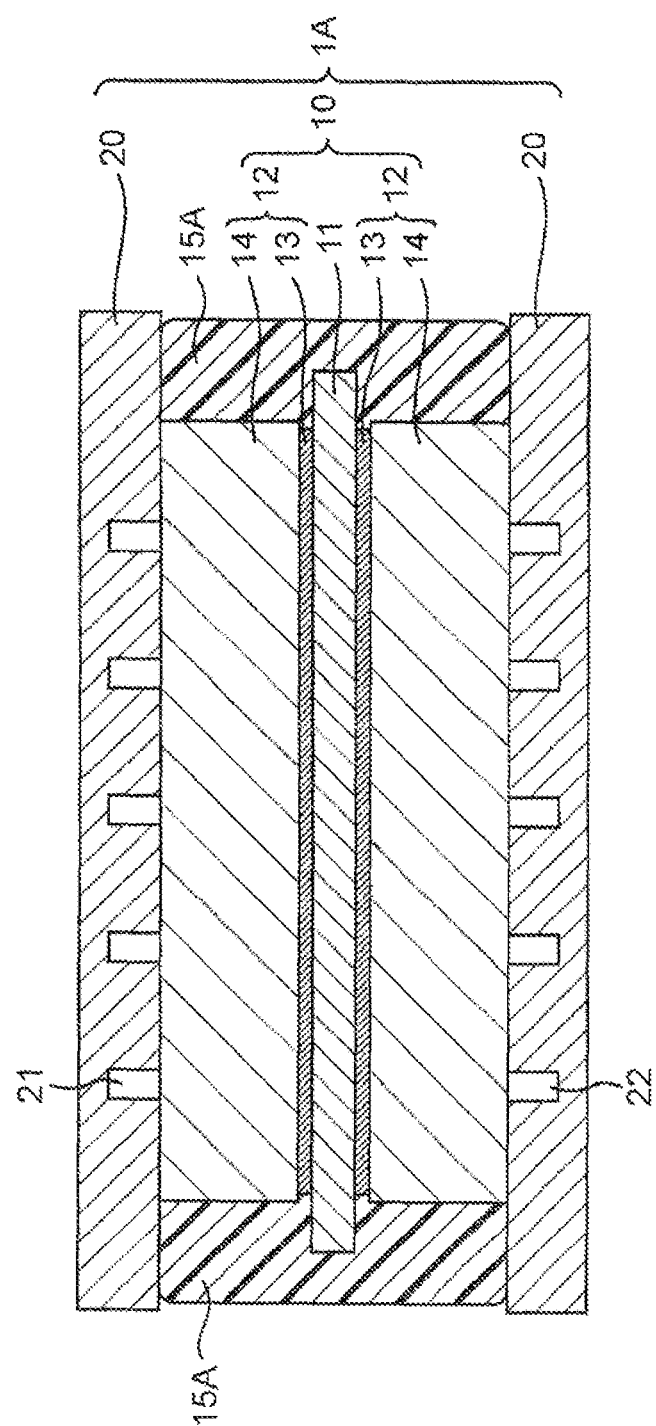
FIG. 5 is a cross-sectional view schematically showing a variation of the basic structure of the fuel cell according to the first embodiment of the present invention.

Further, though it has been described that the sealing member (gasket) 15 is disposed between the separator 20 and the polymer electrolyte membrane 11 so as to cover the side surface of the catalyst layer 13 and that of the gas diffusion layer 14, the present invention is not limited thereto. For example, as shown in FIG. 5, a sealing member 15A may be disposed between the paired separators 20 and 20 so as to cover the side surface of the polymer electrolyte membrane 11, that of the catalyst layer 13, and that of the gas diffusion layer 19. This makes it possible to suppress deterioration of the polymer electrolyte membrane 11, and to improve handleability of the MEA 10, and workability in mass production. It is noted that, it is preferable that the sealing material 15A is partially impregnated in the gas diffusion layer 19, from the viewpoint of power generation durability and strength.

General thermoplastic resin, thermosetting resin or the like can be employed as the sealing materials 15 and 15A. For example, it is possible to use silicone resin, epoxy resin, melamine resin, polyurethane based resin, polyimide based resin, acrylic resin, ABS resin, polypropylene, liquid crystal polymer, polyphenylene sulfide resin, polysulfone, glass fiber reinforced resin, and the like, as the sealing materials 15 and 15A.

Further, though it has been described that the fuel gas flow passage grooves 21 and the oxidant gas flow passage grooves 22 are provided to the paired separators 20 and 20, the present invention is not limited thereto. For example, the fuel gas flow passage grooves 21 and the oxidant gas flow passage grooves 22 are provided to the gas diffusion layers 14 and 19. In this case, for example, in the re-rolling step, to the gas diffusion layers 14 and 14, a plurality of grooves serving as the fuel gas flow passage grooves 21 and the oxidant gas flow passage grooves 22 may be formed substantially in parallel to one another. Further, for example, one of the fuel gas flow passage grooves 21 and the oxidant gas flow passage grooves 22 may be provided to the gas diffusion layer 19. For example, the other one of the fuel gas flow passage grooves 21 and the oxidant gas flow passage grooves 22 may be provided to the separator 20. For example, the fuel gas flow passage grooves 21 and the oxidant gas flow passage grooves 22 may be provided to the gas diffusion layers 19 and 14.

(As to Mix Ratio)

Next, with reference to Table 1, a description will be given of a preferable mix ratio between the conductive particles having a great average particle size and the conductive particles having a small average particle size.

TABLE 1

|  | Sample 1 | Sample 2 | Sample 3 | Sample 4 | Sample 5 | Sample 6 | Sample 7 |
| --- | --- | --- | --- | --- | --- | --- | --- |
| mix ratio of acetylene black and graphite | 1:2.3 | 1:2 | 1:1.5 | 1:1 | 1:0.7 | 1:0.5 | 1:0 |
| thickness | 400 μm | 400 μm | 400 μm | 400 μm | 400 μm | 400 μm | 400 μm |
| porosity | 65% | 42% | 50% | 55% | 60% | 65% | 70% |
| resistance value | 19.9 mΩ | 9.1 mΩ | 12.3 mΩ | 13.7 mΩ | 15.5 mΩ | 20.1 mΩ | 21.6 mΩ |
| voltage value | 0.552 V | 0.639 V | 0.642 V | 0.631 V | 0.621 V | 0.550 V | 0.546 V |

Table 1 is a table showing the porosity of the gas diffusion layer and resistance values and voltage values of the fuel cell, with a fixed thickness of the gas diffusion layer of 900 μm, and with varied mix ratios between graphite as one example of the conductive particles having a great average particle size and acetylene black as one example of the conductive particles having a small average particle size. In this case, fuel cell Samples 1 to 7 differing in mix ratio between acetylene black and graphite were manufactured in the manner described in the following, and the porosity of the gas diffusion layer, the resistance values and the voltage values of each of Samples 1 to 7 were measured.

In the following, a description will be given of a manufacturing method of the fuel cell, which is common to Samples 1 to 7.

First, 150 g of acetylene black (DENKA BLACK: registered trademark, available from DENKI KAGAKU KOGYO KABUSHIKI KAISHA) and graphite (available from Wako Pure Chemical Industries, Ltd.) in total, 7.5 g of a surfactant (Triton X: registered trademark), and 170 g of water are fed in a mixer. Thereafter, the materials are mixed for 60 minutes at a rotation speed of the mixer of 100 rpm. After a lapse of 60 minutes, into the mixture obtained by such mixing, 70 g of PTFE dispersion (AD911, available from ASAHI GLASS CO., LTD.) is blended as the polymer resin, and agitated for extra 5 minutes.

The mixture obtained in this manner is taken out from the mixer by an amount of 90 g, and rolled by a drawing rolling machine (with the gap set to 600 μm) into a sheet. Thereafter, the sheet-shaped mixture is calcined for 30 minutes at 300° C. in a program-controlled calcining furnace, to remove the surfactant and water in the mixture.

The mixture from which the surfactant and water are removed is taken out from the calcining furnace, and again rolled by the drawing rolling machine (gap 400 μm) to adjust the thickness and reduce variations in thickness. Thereafter, the mixture is cut into a 6 cm square. In this manner, a rubber-like gas diffusion layer having a thickness of 400 μm is manufactured.

Simultaneously with the manufacture of the gas diffusion layer, or in succession thereto, to each of the opposite faces of the polymer electrolyte membrane (Nafion 112: registered trademark, available from DuPont), a mixture of platinum-bearing carbon (TEC10E50E, available from Tanaka Kikinzoku Kogyo K.K.) and an ion exchange resin (Flemion: registered trademark, available from ASAHI GLASS CO., LTD.) is applied as a catalyst layer. Thereafter, the mixture is dried to obtain a membrane-catalyst layer assembly. It is noted that the size of the polymer electrolyte membrane is a 15 cm square, and the size of the catalyst layer is a 5.8 cm square. Further, the amount of use of platinum is 0.35 mg/cm$^2$ for the anode electrode side, and 0.6 mg/cm$^2$ for the cathode electrode side.

Subsequently, to each of the opposite faces of the membrane-catalyst layer assembly, the manufactured gas diffusion layer is disposed and joined by hot pressing (80° C., 10 kgf/cm$^2$), to thereby manufacture an MEA.

Subsequently, the manufactured MEA is clamped between paired separators (available from Tokai Carbon Co., Ltd.). In this state and avoiding misalignment, pressure is applied until the fastening pressure reaches 10 kgf/cm$^2$.

In the manner described above, a cell of the fuel cell is manufactured.

Samples 1 to 7 can be manufactured by changing the mix ratio between acetylene black and graphite.

Next, a description will be given of a measuring method (calculating method) of the porosity of the gas diffusion layer.

First, based on the true density and the composition ratio of the materials structuring the gas diffusion layer, the apparent density of the manufactured gas diffusion layer is calculated.

Subsequently, the weight, thickness, longitudinal, and lateral dimensions of the manufactured gas diffusion layer are measured, to calculate the density of the manufactured gas diffusion layer.

Subsequently, into the following equation: porosity=(gas diffusion layer density)/(apparent density)×100, the calculated density and the apparent density of the gas diffusion layer are substituted, to calculate the porosity.

In the manner described above, the porosity of the manufactured gas diffusion layer can be measured.

It is noted that, the pore size distribution of the manufactured gas diffusion layer was measured using a mercury porosimeter, to verify that the porosity that can be calculated from the cumulative pore volume and the porosity calculated in the manner described above agree with each other.

Comparing Samples 2 to 7 against one another with reference to Table 1, it can be seen that, as the mix ratio between acetylene black and graphite approaches near from 1:2 to 1:0 (that is, as the content rate of graphite reduces), the porosity becomes high. Further, with Sample 7 whose mix ratio is 1:0 (that is, acetylene black solely), the porosity is 70%. It is noted that, despite attempts such as adjustment of the gap of the drawing rolling machine, the porosity of less than 70% could not be achieved by acetylene black solely.

On the other hand, when the mix ratio becomes from 1:2 to 1:2.3 (that is, when the amount of graphite becomes more than twice as great as that of acetylene black), the porosity shows a greatly increased value of 65%. It is noted that, an attempt to manufacture a gas diffusion layer whose porosity is less than 42% ended unsuccessful, despite different mix ratios, mixing conditions, calcining conditions, rolling conditions and the like. This can be considered that, the most densely filled structure is formed when the mix ratio is 1:2, whereas the most densely filled structure cannot be formed when the amount of graphite becomes more than twice as great as that of acetylene black.

Next, a description will be given of a measuring method of the resistance values and the voltage values of Samples 1 to 7 shown in Table 1.

First, to each of the samples, an electronic load system (PLZ-4W, available from KIKUSUI ELECTRONICS CORPORATION) is connected.

Subsequently, as the fuel gas, pure hydrogen is caused to flow through the anode electrode, and as the oxidant gas, air is caused to flow through the cathode electrode. Here, utilization is 70% and 40%, respectively. Further, a gas humidification dew point of 65° C. is set for the anode electrode, and that of 35° C. is set for the cathode electrode. Further, the cell temperature is set to 90° C.

Subsequently, the voltage value and the resistance value when the current density is 0.2 A/cm$^2$ are measured. It is noted that, to measure the resistance value during power generation, an AC four-terminal resistance meter (MODEL3566, available from Tsuruga Electric Corporation) is used.

It is noted that, the measured resistance value contains the resistance in relation to proton conductivity (membrane resistance) indicative of a wet state of the polymer electrolyte membrane, the internal resistance (resistance in relation to electrical conduction) of each of the members including the gas diffusion layer, and the contact resistance (resistance in relation to electrical conduction) between each of the members.

Comparing Samples 1 to 7 against one another with reference to Table 1, it can be seen that, as the mix ratio between acetylene black and graphite approaches near from 1:2 to 1:0, in other words, as the porosity becomes greater, the resistance value becomes higher and the voltage value becomes lower. Further, comparing Sample 5 whose mix ratio is 1:0.7 and Sample 6 whose mix ratio is 1:0.5 against each other, it can be seen that the resistance value and the voltage value sharply change. That is, when the porosity becomes greater than 60%, the resistance value sharply becomes high, and the voltage value becomes sharply low. On the other hand, comparing Sample 2 whose mix ratio is 1:2 and Sample 1 whose mix ratio is 1:2.3, it can be seen that the resistance value of the Sample 1 is greatly high, and the voltage value thereof is greatly low. That is, it can be seen that, when the porosity becomes greater than 60%, the resistance value sharply becomes high, and the voltage value sharply becomes low.

This can be considered that, when the porosity is greater than 60%, the sparsely structured gas diffusion layer facilitates mobility of the gas and water in the fuel cell, allowing the water or water vapor to easily be discharged outside the system, which results in a reduction in water retentivity. When the water retentivity is reduced, resistance components (in particular, the membrane resistance) increase, which results in a reduction in voltage.

Though a gas diffusion layer having a porosity of less than 42% was not manufactured, based on that a low porosity reduces gas diffusion performance, it is considered that a sufficient electrochemical reaction does not occur and the voltage value reduces.

Accordingly, based on the foregoing test results and discussion, it is considered that the mix ratio between acetylene black and graphite is preferably 1:0.7 to 1:2. Further, considering the voltage value of each sample shown in Table 1, the mix ratio between acetylene black and graphite may more preferably be 1:1.5 to 1:2. Still further, it is considered that the porosity is preferably 42% or more and 60% or less. Still further, considering the voltage value of each sample shown in Table 1, the porosity may more preferably be 42% or more and 50% or less.

(As to Thickness)

Next, with reference to Table 2, a description will be given of the preferable thickness of the gas diffusion layer.

TABLE 2

|  | Sample 8 | Sample 9 | Sample 10 | Sample 11 | Sample 12 | Sample 13 | Sample 14 | Sample 15 | Sample 16 |
|---|---|---|---|---|---|---|---|---|---|
| mix ratio of acetylene black and graphite | 1:2 | 1:2 | 1:2 | 1:2 | 1:2 | 1:2 | 1:2 | 1:2 | 1:2 |
| thickness | 200 μm | 250 μm | 300 μm | 350 μm | 400 μm | 500 μm | 600 μm | 650 μm | 700 μm |
| porosity | 45% | 45% | 45% | 45% | 45% | 45% | 45% | 45% | 45% |
| resistance value | 29.8 mΩ | 28.5 mΩ | 18.7 mΩ | 11.6 mΩ | 9.1 mΩ | 12.5 mΩ | 14.5 mΩ | 24.4 mΩ | 27.0 mΩ |
| voltage value | 0.451 V | 0.468 V | 0.608 V | 0.621 V | 0.639 V | 0.625 V | 0.612 V | 0.548 V | 0.469 V |

Table 2 is a table showing resistance values and voltage values of the fuel cell, with a fixed mix ratio between acetylene black and graphite of 1:2, and with varied thicknesses of the gas diffusion layer. It is noted that, because the porosity is determined by the mix ratio, it is uniformly 45%. In this case, fuel cell Samples 8 to 16 differing in thickness of the gas diffusion layer were manufactured in the manner described in the following, and the resistance value and voltage value of each sample were measured. It is noted that the measuring method of the resistance values and the voltage values are similar to the measuring method of the resistance values and the voltage values of Samples 1 to 7 described with reference to Table 1.

In the following, a description will be given of the manufacturing method of the fuel cell common to the samples. It is noted that, the description will be given without repeating the description as to the part similar to that included in the manufacturing method of the Samples 1 to 7 described with reference to Table 1.

First, 50 g of acetylene black, 100 g of graphite, 7.5 g of surfactant, 170 g of water are fed into a mixer. Thereafter, the materials are mixed for 60 minutes at a rotation speed of the mixer of 100 rpm. After a lapse of 60 minutes, into the mixture obtained by the mixing, 35 g of PTFE dispersion is blended as a polymer resin, and agitated for extra 5 minutes.

The mixture obtained in this manner is taken out from the mixer, and rolled by a drawing rolling machine having its gap adjusted, into a sheet. Thereafter, the sheet-shaped mixture is calcined for 30 minutes at 300° C. in a program-controlled calcining furnace, to remove the surfactant and water in the mixture.

The mixture from which the surfactant and water are removed is taken out from the calcining furnace, and again rolled by the drawing rolling machine having its gap adjusted, to adjust the thickness and reduce variations in thickness. Thereafter, the re-rolled mixture is cut into a 6 cm square, to manufacture a rubber-like gas diffusion layer.

Simultaneously with the manufacture of the gas diffusion layer, or in succession thereto, to each of the opposite faces of the polymer electrolyte membrane, a mixture of platinum-bearing carbon and an ion exchange resin is applied as a catalyst layer. Thereafter, the mixture is dried to obtain a membrane-catalyst layer assembly.

Subsequently, to each of the opposite faces of the membrane-catalyst layer assembly, the manufactured gas diffusion layer is disposed and joined by hot pressing, to thereby manufacture an MEA. Thereafter, the manufactured MEA is clamped between paired separators. In this state and avoiding misalignment, pressure is applied until the fastening pressure reaches 10 kgf/cm$^2$.

In the manner described above, a cell of the fuel cell is manufactured.

Samples 8 to 16 can be manufactured by changing the gap of the drawing rolling machine when rolled.

Comparing sample 10 whose thickness is 300 μm and Sample 9 whose thickness is 250 μm against each other as to the resistance value and the voltage value with reference to Table 2, it can be seen that Sample 9 is greatly higher in resistance value and greatly lower in voltage value. This can be considered that, because the reduced thickness improved the gas permeability of the gas diffusion layer, the water retentivity (moisture retentivity) under low-humidity drive was reduced to dry the polymer electrolyte membrane, which brought about an increase in the membrane resistance.

Comparing Sample 19 whose thickness is 600 μm and Sample 15 whose thickness is 650 μm against each other as to the resistance value and the voltage value with reference to Table 2, it can be seen that Sample 15 exhibits a greatly higher resistance value, and a greatly lower voltage value. It can be considered that the increased thickness increased the internal resistance (resistance in relation to electrical conduction) of the gas diffusion layer. Further, it can be considered that an increase in the thickness reduced the gas permeability of the gas diffusion layer, making it difficult for the fuel gas and the oxidant gas to reach the catalyst layer, whereby sufficient electrochemical reaction failed to occur.

Accordingly, based on the foregoing test results and discussion, it is considered that the thickness of the gas diffusion layer is preferably 300 μm or more and 600 μm or less. Further, considering the voltage value of each sample shown in Table 2, the thickness of the gas diffusion layer may more preferably be 350 μm or more and 500 μm or less.

It is noted that, through two manufacturing methods different from the manufacturing method of Sample 2, gas diffusion layers having the same mix ratio, thickness, and porosity as the gas diffusion layer of Sample 2 were manufactured, and the resistance value and voltage value of the fuel cells including the gas diffusion layers were measured, to verify that they exhibit the same resistance value and voltage value as that of Sample 2.

One of the manufacturing methods is specifically as follows.

First, a mixture obtained by mixing with the mixer undergoes processing with an extruder (twin full flight screw length: 50 cm, T die width: 7 cm, gap: 600 μm) instead of the drawing rolling machine, to be molded into a sheet having a thickness of 600 μm and a width of 7 cm. Thereafter, the sheet-formed mixture is calcined for 30 minutes at 300° C. in a program-controlled calcining furnace, to remove the surfactant and water in the mixture.

The mixture from which the surfactant and water are removed is taken out from the calcining furnace, and again rolled by the drawing rolling machine having its gap adjusted to 400 μm, to adjust the thickness and reduce variations in thickness. Thereafter, the re-rolled mixture is cut into a 6 cm square. In this manner, a rubber-like gas diffusion layer having a thickness of 400 μm and a porosity of 42% similarly to Sample 2 is obtained.

Further, the other manufacturing method is specifically as follows.

First, materials of the same composition as Sample 2 undergoes processing with an extruder (twin full flight screw length: 100 cm, T die width: 7 cm, gap: 600 μm) instead of the mixer, to be mixed, extruded, and molded into a sheet. Thereafter, the sheet-formed mixture is calcined for 30 minutes at 300° C. in a program-controlled calcining furnace, to remove the surfactant and water in the mixture.

The mixture from which the surfactant and water are removed is taken out from the calcining furnace, and again rolled by the drawing rolling machine having its gap adjusted to 400 μm, to adjust the thickness and reduce variations in thickness. Thereafter, the re-rolled mixture is cut into a 6 cm square. In this manner, a rubber-like gas diffusion layer having a thickness of 400 μm and a porosity of 42% similarly to Sample 2 is obtained.

Second Embodiment

A description will be given of a fuel cell according to a second embodiment of the present invention. The fuel cell according to the second embodiment is different from the fuel cell according to the first embodiment in that carbon fibers of a weight not qualifying as a base member are added to the gas diffusion layer 19. The other aspects are the same as the first embodiment and, accordingly, the description common to them is not repeated, and the description will be given chiefly of the difference.

The gas diffusion layer according to the second embodiment is structured with a sheet-like and rubber-like porous member mainly comprised of conductive particles and polymer resin, with added carbon fibers of a weight not qualifying as a base member (e.g., of a weight smaller than the conductive particles and the polymer resin).

Example materials of the carbon fibers may include vapor grown carbon fibers (hereinafter referred to as VGCFs) milled fibers, cut fibers, chopped fibers and the like. In a case where VGCFs are used as the carbon fiber, for example, the one whose fiber diameter is 0.15 μm and whose fiber length is 15 μm may be used. Further, in a case where the milled fibers, the cut fibers, or the chopped fibers are used as the carbon fibers, for example, the one whose fiber diameter is 5 to 20 μm, and whose fiber length is 20 μm to 100 μm may be used.

The raw material of the milled fibers, the cut fibers, or the chopped fibers may be any of PAN based, pitch based, and rayon based. Further, the fibers are preferably prepared by cutting and shredding an original fiber (a long fiber filament or a short fiber staple) and used as a bundle of such fibers being dispersed.

Further, the gas diffusion layer according to the second embodiment may contain, in addition to the conductive particles, the polymer resin, and the carbon fibers, a trace of surfactant, dispersing solvent and the like which are used in manufacturing the gas diffusion layer.

Figure 6:
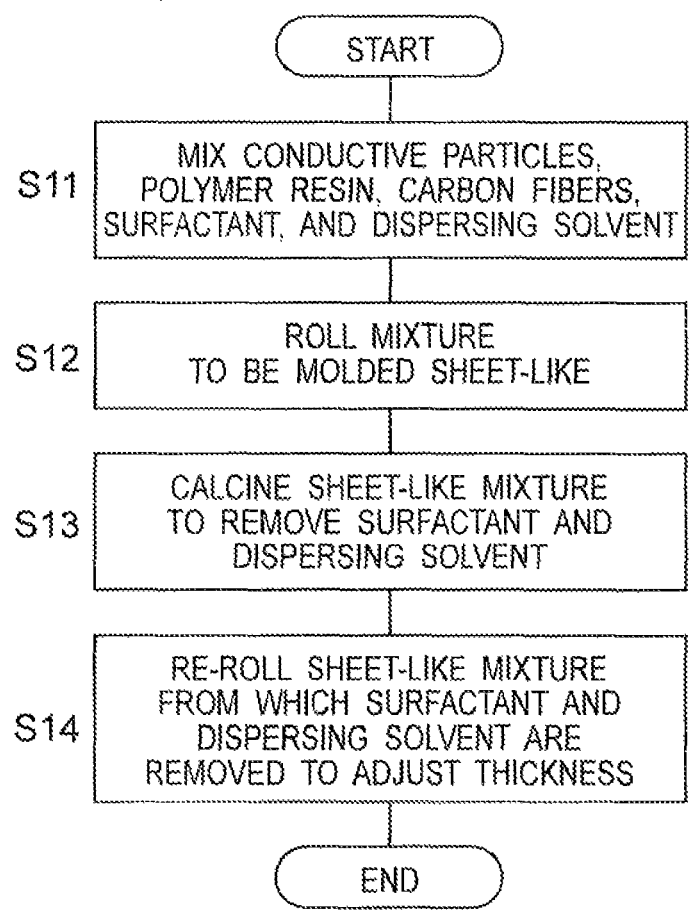
FIG. 6 is a flowchart showing a manufacturing method of the gas diffusion layer according to the first embodiment of the present invention.
Figure 7:
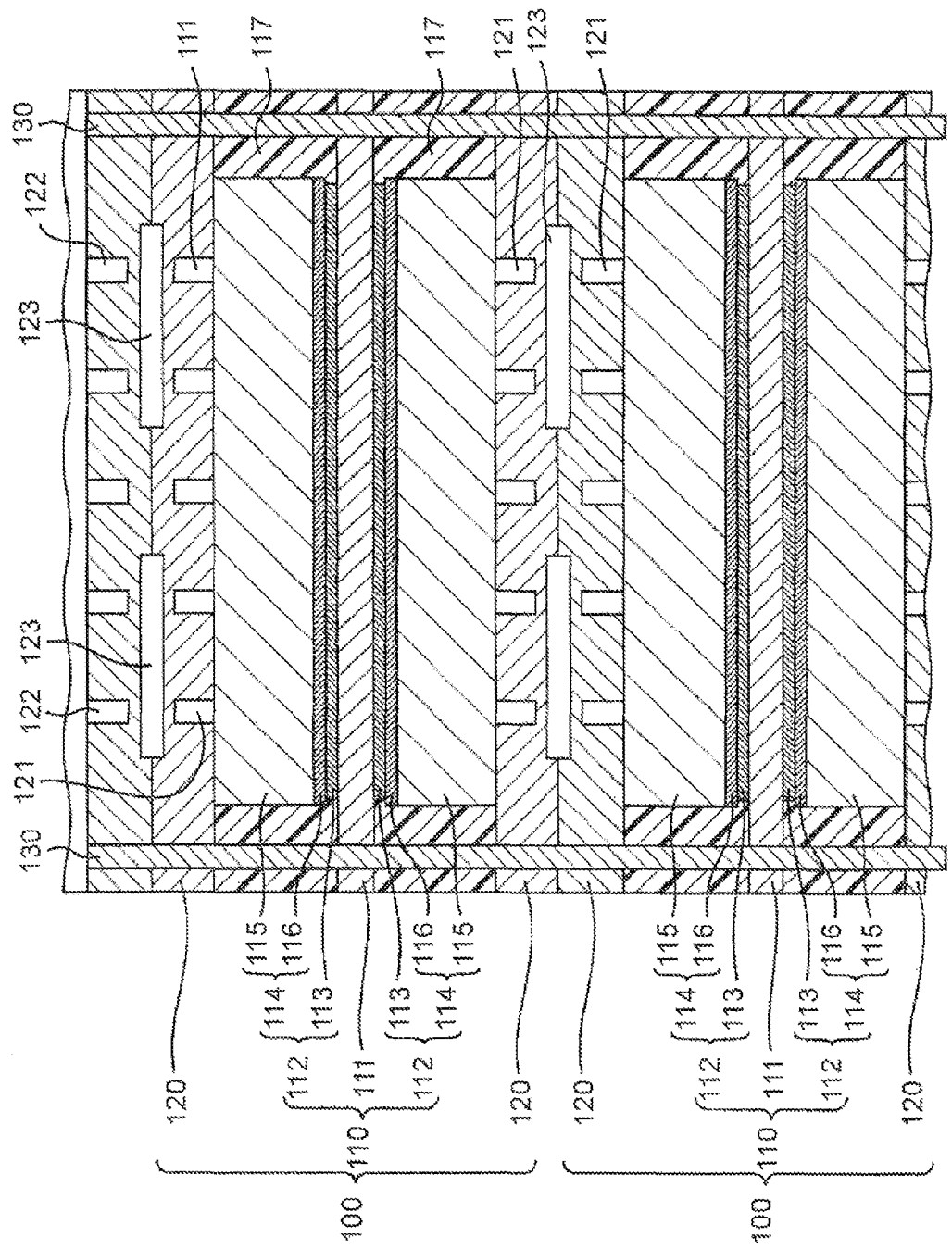
FIG. 7 is a cross-sectional view schematically showing the basic structure of a conventional fuel cell.

Next, with reference to FIG. 6, a description will be given of a manufacturing method of the gas diffusion layer according to the second embodiment of the present invention.

First, in step S11, conductive particles, a polymer resin, carbon fibers, a surfactant, and a dispersing solvent are mixed. More specifically, conductive particles, carbon fibers, a surfactant, and a dispersing solvent are fed into an agitator/mixer, to be mixed so that they are crushed and granulated. Thereafter, into the mixture, a polymer resin material is added, to be further dispersed. It is noted that, instead of feeding the polymer resin material separately from other materials into the mixer, all the materials including the polymer resin material may be fed into the mixer at once.

In step S12, the mixture obtained by mixing is rolled by a roll press machine, a flat plate press machine or the like, to be molded into a sheet.

In step S13, the sheet-like molded mixture is calcined, to remove the surfactant and the dispersing solvent from the mixture.

In step S19, the mixture from which the surfactant and the dispersing solvent are removed is rolled again, to adjust the thickness.

In this manner, the gas diffusion layer according to the second embodiment of the present invention can be manufactured.

Because the gas diffusion layer according to the second embodiment is structured with the porous member mainly comprised of the conductive particles and the polymer resin with the added carbon fibers by a weight smaller than that of the polymer resin, and the carbon fibers are not used as the base member, a reduction in the costs of the fuel cell can be achieved. Further, addition of the carbon fibers makes it possible to increase the strength as the gas diffusion layer. Therefore, it becomes possible to reduce the mix amount of the polymer resin functioning as the binder. Accordingly, the mix ratio of the polymer resin being an insulator can be reduced, and hence an improvement in power generation performance can be achieved.

(As to the Mix Ratio of Carbon Fibers)

Next, with reference to Table 3, a description will be given of a preferable mix ratio of the carbon fibers.

In the following, a description will be given of a manufacturing method of the gas diffusion layer common to Samples 17 to 23.

First, acetylene black as one example of conductive particles having a small average particle size (DENKA BLACK: registered trademark, available from DENKI KAGAKU KOGYO KABUSHIKI KAISHA), graphite as one example of the conductive particles having a great average particle size (available from Wako Pure Chemical Industries, Ltd.), VGCFs (fiber diameter 0.15 μm, fiber length 15 μm, available from Showa Denko K.K.), 4 g of a surfactant (Triton X: registered trademark), and 200 g of water as one example of the dispersing solvent are fed into the mixer. Here, the total amount of acetylene black, graphite and VGCFs is 133 g, and the mix ratio between acetylene black and graphite is 1:1.6.

After the materials are fed into the mixer, they are mixed for 60 minutes at a rotation speed of the mixer of 100 rpm. After a lapse of 60 minutes, into the mixture obtained by such mixing, 25 g of PTFE dispersion (AD911, solid content ratio 60%, available from ASAHI GLASS CO., LTD.) is blended as the polymer resin, and agitated for extra 5 minutes.

The mixture obtained in this manner is taken out from the mixer by an amount of 20 g, and rolled by a drawing rolling machine (with the gap set to 600 μm) into a sheet. Thereafter, the sheet-shaped mixture is calcined for 2 hours at 300° C. in a program-controlled calcining furnace, to remove the surfactant and water in the mixture.

The mixture from which the surfactant and water are removed is taken out from the calcining furnace, and again rolled by the drawing rolling machine (gap 400 μm) to adjust

TABLE 3

| | Sample 17 | Sample 18 | Sample 19 | Sample 20 | Sample 21 | Sample 22 | Sample 23 |
|---|---|---|---|---|---|---|---|
| mix ratio of VGCF | 1.5% | 2.0% | 4.0% | 6.0% | 7.5% | 8.5% | 10.0% |
| mix ratio of PTFE | 10% | 10% | 10% | 10% | 10% | 10% | 10% |
| thickness | 400 μm | 400 μm | 400 μm | 400 μm | 400 μm | 400 μm | 400 μm |
| internal resistance value | 77 mΩ·cm$^2$ | 50 mΩ·cm$^2$ | 48 mΩ·cm$^2$ | 45 mΩ·cm$^2$ | 40 mΩ·cm$^2$ | 40 mΩ·cm$^2$ | 40 mΩ·cm$^2$ |
| presence/absence of membrane damage (micro short circuit) | absent | absent | absent | absent | absent | present | present |

Table 3 is a table showing the internal resistance value and presence and absence of damage (micro short circuit) of the polymer electrolyte membrane, with the gas diffusion layer having its thickness fixed to 400 μm, having the mix ratio of PTFE as one example of the polymer resin fixed to 10%, and the mix ratio of VGCFs as one example of the carbon fibers varied. Here, Samples 17 to 23 of gas diffusion layers which differ from one another in mix ratio of VGCFs were manufactured in the manner described in the following, to examine the internal resistance values of the gas diffusion layer of Samples 17 to 23, and the presence and absence of damage of the polymer electrolyte membrane thereof. It is noted that, because the carbon fibers are normally made of a material harder than the polymer electrolyte membrane, depending on the mix ratio of the carbon fibers, the polymer electrolyte membrane may disadvantageously be penetrated and damaged. The damage done to the polymer electrolyte membrane may invite a reduction in durability of the fuel cell. Accordingly, Table 3 shows the presence and absence of damage of the polymer electrolyte membrane.

the thickness and reduce variations in thickness. Thereafter, the mixture is cut into a 6 cm square. In this manner, a rubber-like gas diffusion layer having a thickness of 400 μm is manufactured.

Samples 17 to 23 can be manufactured just by changing the mix ratio of VGCFs.

It is noted that, for example in Sample 18, acetylene black is 50 g, graphite is 80 g, and VGCFs are 3 g. In this case, the mix ratio (on a weight basis) of VGCFs and the mix ratio (on a weight basis) of PTFE can be determined as follows:

The mix ratio of VGCFs:VGCFs 3 g÷(acetylene black 50 g+graphite 80 g+VGCFs 3 g+PTFE25 g×60%)×100=approx. 2.0%

The mix ratio of PTFE:PTFE 25 g×60%÷(acetylene black 50 g+graphite 80 g+VGCFs 3 g+PTFE 25 g×60%)×100=approx. 10.0%

Next, a description will be given of a measuring method of the internal resistance (electric conductivity) of the gas diffusion layers of Samples 17 to 23 shown in Table 3.

First, each of the samples is punched out to have a diameter of 4 cm.

Subsequently, the samples are each applied with a compression load using a compression test machine (EZ-graph, available from Shimadzu Corporation), such that the pressure (surface pressure) becomes 1.5 kg/cm².

In this state, using an AC four-terminal resistance meter (MODEL 3566, available from Tsuruga Electric Corporation), the internal resistance value is measured.

Next, a description will be given of a method of determining the presence and absence of damage of the polymer electrolyte membrane to which each gas diffusion layer of Samples 17 to 23 shown in Table 3 is attached.

First, in order to determine the presence and absence of damage of the polymer electrolyte membrane, a pseudo fuel cell (without a catalyst layer) is manufactured for each sample. Specifically, paired samples having the same mix ratio of VGCFs are disposed on the opposite faces of the polymer electrolyte membrane (Nafion 112: registered trademark, available from DuPont), respectively, and joined by hot pressing (80° C., 10 kgf/cm²), to thereby manufacture an MEA. Thereafter, the manufactured MEA is clamped between paired separators (available from Tokai Carbon Co., Ltd.). In this state and avoiding misalignment, pressure is applied until the fastening pressure reaches 10 kgf/cm². In this manner, a pseudo fuel cell is manufactured.

Subsequently, the pseudo fuel cell prepared in the foregoing manner is connected to an electrochemical measurement system (HZ-3000, available from HOKUTO DENKO CORPORATION).

Subsequently, a load of 0.4 V is applied to the pseudo fuel cell, to measure an electric current value at that time.

Here, it is expected that a high current of 300 mA or more will be measured due to micro short circuit, in a case where any damage is done to the polymer electrolyte membrane.

Accordingly, when the measured current value is 300 mA or more, it is determined that damage is "present"; when the measured current value is less than 300 mA, it is determined that damage is "absent".

Next, the test results measured or determined in the foregoing manner are discussed.

Comparing the internal resistance values of Samples 17 to 23 against one another with reference to Table 3, it can be seen that, as the mix ratio of VGCFs becomes lower, the internal resistance value increases. Further, comparing Sample 18 whose mix ratio of VGCFs is 2.0 weight percent and Sample 17 whose mix ratio of VGCFs is 1.5 weight percent against each other, it can be seen that the internal resistance value greatly differs. That is, it can be seen that, when the mix ratio of VGCFs is lower than 2.0 weight percent, the internal resistance value becomes sharply high. Accordingly, it can be considered that the mix ratio of VGCFs is preferably 2.0 weight percent or more.

Discussing the presence and absence of damage of the polymer electrolyte membrane with reference to Table 3, with the pseudo fuel cells using Samples 17 to 21 whose mix ratio of VGCFs is 7.5 weight percent or less, no damage is found in the polymer electrolyte membrane. In contrast thereto, with the pseudo fuel cells using Samples 22 and 23 whose mix ratio of VGCFs is greater than 7.5 weight percent, damage is found in the polymer electrolyte membrane.

Accordingly, based on the test results and discussion, it is considered that the mix ratio of VGCFs is preferably 2.0 weight percent or more and 7.5 weight percent or less.

It is noted that, a gas diffusion layer was manufactured in accordance with a manufacturing method which was identical to that of Sample 18 except that chopped fibers (M-201F, available from KUREHA CORPORATION, fiber diameter 12.5 μm, fiber length 150 μm) were used instead of VGCFs, and the internal resistance value of the gas diffusion layer and the presence and absence of damage of the polymer electrolyte membrane were examined, to obtain the same result as Sample 18. That is, the internal resistance value was 50 mΩ·cm², and no damage was found in the polymer electrolyte membrane. Further, in a case where, instead of VGCFs, milled fibers (M-2007S, available from KUREHA CORPORATION, fiber diameter 14.5 μm, fiber length 90 μm), cut fibers (T008-3, available from Toray Industries, Inc., fiber diameter 7 μm), or milled fibers (MLD-30, available from Toray Industries, Inc., fiber diameter 7 μm, fiber length 30 μm) were used, the obtained result was the same as that of Sample 18.

(As to Mix Ratio of Polymer Resin)

Next, with reference to Table 4, a description will be given of the preferable mix ratio of the polymer resin.

TABLE 4

|  | Sample 24 | Sample 25 | Sample 26 | Sample 27 | Sample 28 | Sample 29 |
|---|---|---|---|---|---|---|
| mix ratio of VGCF | 2.0% | 2.0% | 2.0% | 2.0% | 2.0% | 2.0% |
| mix ratio of PTFE | 10% | 12.5% | 15% | 17% | 20% | 26% |
| thickness | 400 μm | 400 μm | 400 μm | 400 μm | 400 μm | 400 μm |
| internal resistance value | 50 mΩ·cm² | 52 mΩ·cm² | 57 mΩ·cm² | 60 mΩ·cm² | 78 mΩ·cm² | 92 mΩ·cm² |
| presence/absence of membrane damage (micro short circuit) | absent | absent | absent | absent | absent | absent |

Table 4 is a table showing the internal resistance value and the presence and absence of damage of the polymer electrolyte membrane, with the gas diffusion layer having its thickness fixed to 400 μm, having the mix ratio of VGCFs as one example of the carbon fibers fixed to 2.0 weight percent, and the mix ratio of PTFE as one example of the polymer resin varied. Except that the blending amount of the PTFE dispersion is changed, the gas diffusion layers of Samples 24 to 29 are manufactured according to a manufacturing method similar to that of Sample 18, whose description has been given with reference to Table 3. Further, the internal resistance value measuring method and the method for determining presence and absence of damage of the polymer electrolyte membrane are identical to the internal resistance value measuring method and the method for determining presence and absence of damage of the polymer electrolyte membrane of Samples 17 to 23 whose description has been given with reference to Table 3.

Next, the test results measured or determined in the foregoing manner are discussed.

Comparing the internal resistance values of Samples 24 to 29 against one another with reference to Table 4, it can be seen that, as the mix ratio of PTFE becomes higher, the internal resistance value increases. Further, comparing Sample 27 whose mix ratio of PTFE is 17 weight percent and Sample 28 whose mix ratio of PTFE is 20 weight percent against each other, it can be seen that the internal resistance value greatly differs. That is, it can be seen that, when the mix ratio of PTFE is higher than 17 weight percent, the internal resistance value becomes sharply high.

It is noted that, an attempt was made to manufacture a sheet-like gas diffusion layer whose mix ratio of PTFE is less than 10 weight percent. However, under whatever modified conditions in relation to the mix ratio of VGCFs, the mixing time, the mixing speed, the rolling condition and the like, such a gas diffusion layer could not be manufactured. This may be due to the reduced mix ratio of PTFE, which weakened the function of PTFE as the binder, impairing the bindingness among conductive materials.

Accordingly, based on the foregoing test results and discussion, it is considered that the mix ratio of PTFE is preferably 10 weight percent or more and 17 weight percent or less.

On the other hand, as to the presence and absence of damage of the polymer electrolyte membrane, no damage was found in any of the polymer electrolyte membranes of Samples 24 to 29. Accordingly, it can be seen that the presence and absence of damage of the polymer electrolyte membrane is not affected by the mix ratio of PTFE.

(As to Thickness)

Next, a description will be given of the preferable thickness of the gas diffusion layer when carbon fibers are added, with reference to Table 5.

the polymer electrolyte membrane of Samples 17 to 23, whose description has been given with reference to Table 3.

In the following, a description will be given of a manufacturing method of the gas diffusion layer common to the samples. It is noted that, the description of those parts similar to the manufacturing method of Samples 17 to 23, whose description has been given with reference to Table 3, will not be repeated.

First, 50 g of acetylene black, 80 g of graphite, 3 g of VGCFs, 4 g of a surfactant, and 200 g of water are fed into a mixer. After the materials are fed into the mixer, they are mixed for 60 minutes at a rotation speed of the mixer of 100 rpm. After a lapse of 60 minutes, into the mixture obtained by such mixing, 25 g of PTFE dispersion is blended, and agitated for extra 5 minutes.

The mixture obtained in this manner is taken out from the mixer, and rolled into a sheet by a drawing rolling machine with its gap adjusted. Thereafter, the sheet-shaped mixture is calcined for 2 hours at 300° C. in a program-controlled calcining furnace, to remove the surfactant and water in the mixture.

The mixture from which the surfactant and water are removed is taken out from the calcining furnace, and again rolled by the drawing rolling machine with its gap adjusted, to adjust the thickness and reduce variations in thickness. Thereafter, the re-rolled mixture is cut into a 6 cm square.

In the foregoing manner, a rubber-like gas diffusion layer is manufactured.

Samples 30 to 35 can be manufactured by changing the gap of the drawing rolling machine when rolled.

Next, the test results measured or determined in the foregoing manner are discussed.

Comparing the internal resistance values of Samples 30 to 35 against one another with reference to Table 5, it can be seen

TABLE 5

| | Sample 30 | Sample 31 | Sample 32 | Sample 33 | Sample 34 | Sample 35 |
|---|---|---|---|---|---|---|
| mix ratio of VGCF | 2.0% | 2.0% | 2.0% | 2.0% | 2.0% | 2.0% |
| mix ratio of PTFE | 10% | 10% | 10% | 10% | 10% | 10% |
| thickness | 150 μm | 200 μm | 400 μm | 600 μm | 650 μm | 700 μm |
| internal resistance value | 33 mΩ·cm$^2$ | 42 mΩ·cm$^2$ | 51 mΩ·cm$^2$ | 59 mΩ·cm$^2$ | 74 mΩ·cm$^2$ | 80 mΩ·cm$^2$ |
| presence/absence of membrane damage (micro short circuit) | absent | absent | absent | absent | absent | absent |

Table 5 is a table showing the internal resistance value and the presence and absence of damage of the polymer electrolyte membrane, with the mix ratio of VGCFs as one example of the carbon fibers fixed to 2.0 weight percent, the mix ratio of PTFE as one example of the polymer resin fixed to 10 weight percent, and the thickness of the gas diffusion layer varied. Here, Samples 30 to 35 of gas diffusion layers differing in thickness from one another were manufactured according to the following manner, and the internal resistance value and the presence and absence of damage of the polymer electrolyte membrane of each sample were examined. It is noted that, the internal resistance value measuring method and the method for determining presence and absence of damage of the polymer electrolyte membrane are identical to the internal resistance value measuring method and the method for determining presence and absence of damage of that, as the thickness of the gas diffusion layer becomes greater, the internal resistance value increases. Further, comparing Sample 33 whose thickness is 600 μm and Sample 34 whose thickness is 650 μm as to the internal resistance value, it can be seen that Sample 34 is greatly higher in the internal resistance value. It is noted that, an attempt was made to manufacture a sheet-like gas diffusion layer whose thickness was less than 150 μm. However, because of insufficient strength, the internal resistance could not be measured stably. Further, even if it can be manufactured, it is expected that the water retentivity (moisture retentivity) under low-humidity drive reduces and the polymer electrolyte membrane becomes dry because the reduced thickness promotes the gas permeability of gas diffusion layer, and therefore the internal resistance increases.

Accordingly, based on the foregoing test results and discussion, it is considered that the thickness of the gas diffusion layer is preferably 150 μm or more and 600 μm or less.

On the other hand, as to the presence and absence of damage of the polymer electrolyte membrane, no damage was found in any of the polymer electrolyte membranes of Samples 30 to 35. Accordingly, it can be seen that the presence and absence of damage of the polymer electrolyte membrane is not affected by the thickness of the gas diffusion layer.

It is noted that, through two manufacturing methods different from the manufacturing method of Sample 18, gas diffusion layers having the same mix ratio of VGCFs (2.0 weight percent), mix ratio of PTFE (10 weight percent), and thickness (400 μm) as the gas diffusion layer of Sample 18 were manufactured, and the internal resistance value and presence and absence of damage of the polymer electrolyte membrane were examined, to obtain the same results as Sample 18. That is, the internal resistance value was 50 mΩ·cm$^2$, and no damage was found in the polymer electrolyte membrane.

One of the manufacturing methods is specifically as follows.

First, the mixture obtained by mixing with the mixer undergoes processing with an extruder (twin full flight screw length: 50 cm, T die width: 7 cm, gap: 600 μm) instead of the drawing rolling machine, to be molded into a sheet having a thickness of 600 μm, and a width of 7 cm. Thereafter, the sheet-formed mixture is calcined for 30 minutes at 300° C. in a program-controlled calcining furnace, to remove the surfactant and water in the mixture.

The mixture from which the surfactant and water are removed is taken out from the calcining furnace, and again rolled by the drawing rolling machine having its gap adjusted to 400 μm, to adjust the thickness and reduce variations in thickness. Thereafter, the re-rolled mixture is cut into 6 cm square. In this manner, a gas diffusion layer whose mix ratio of VGCFs, mix ratio of PTFE, and thickness are similar to those of Sample 18 is obtained.

Further, the other manufacturing method is specifically as follows.

First, materials of the same composition as Sample 18 undergoes processing with an extruder (twin full flight screw: 100 cm, T die width: 7 cm, gap: 600 μm) instead of the mixer, to be mixed, extruded, and molded into a sheet. Thereafter, the sheet-formed mixture is calcined for 30 minutes at 300° C. in a program-controlled calcining furnace, to remove the surfactant and water in the mixture.

The mixture from which the surfactant and water are removed is taken out from the calcining furnace, and again rolled by the drawing rolling machine having its gap adjusted to 400 μm, to adjust the thickness and reduce variations in thickness. Thereafter, the re-rolled mixture is cut into a 6 cm square. In this manner, a gas diffusion layer whose mix ratio of VGCFs, mix ratio of PTFE, and thickness are similar to those of Sample 18 is obtained.

It is noted that, an attempt was made to reduce the mix amount of PTFE without using carbon fibers at all. When the mix ratio of PTFE was 20 weight percent, a sheet-like gas diffusion layer could be manufactured through a manufacturing method similar to those of the above-described samples. However, the internal resistance value of the gas diffusion layer became higher than the internal resistance value (78 mΩ·cm$^2$) of Sample 28, whose mix ratio of PTFE was 20 weight percent. Thus, it can be seen that use of carbon fibers is effective for suppressing an increase in the internal resistance value.

Further, though an attempt was made to reduce the mix ratio of PTFE without using carbon fibers at all, strength as a sheet-like gas diffusion layer could not fully be secured. That is, though use of carbon fibers allows the mix ratio of PTFE to be less than 20 weight percent, without use of carbon fibers, the mix ratio of PTFE fails to be less than 20 weight percent. Accordingly, it can be seen that use of carbon fibers is effective in increasing the strength as a sheet-like gas diffusion layer. It is noted that, use of carbon fibers so as to increase the strength of the sheet-like molded mixture makes it easier to manufacture a gas diffusion layer by employing roll molding in which the mixture is rolled into a sheet.

By properly combining arbitrary embodiments of the aforementioned various embodiments, the effects owned by each of them can be made effectual.

INDUSTRIAL APPLICABILITY

The gas diffusion layer for fuel cell of the present invention can realize both an improvement in the power generation performance of a fuel cell and a reduction in costs. Therefore, it is useful for fuel cells in general.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The disclosure of Japanese Patent Application Nos. 2008-281458 and 2008-281553 both filed on Oct. 31, 2008 including specification, drawings, and claims are incorporated herein by reference in its entirety.

DESCRIPTION OF REFERENCE SYMBOLS 1, 1A fuel cell
10 membrane electrode assembly
11 polymer electrolyte membrane
12 electrode layer
13 catalyst layer
14 gas diffusion layer
15, 15A sealing member
20 separator
21 fuel gas flow passage groove
22 oxidant gas flow passage groove

The invention claimed is:

1. A gas diffusion layer used for a fuel cell, wherein the gas diffusion layer is structured with a porous member whose principal components are conductive particles (excluding conductive particles modified with boron) and a polymer resin, with carbon fibers added by a weight smaller than a weight of the polymer resin, and the porous member includes the carbon fibers by 2.0 weight percent or more and 7.5 weight percent or less, and includes the polymer resin by 10 weight percent or more and 17 weight percent or less.

2. The gas diffusion layer according to claim 1, wherein the carbon fibers are one of vapor grown carbon fibers, milled fibers, cut fibers, and chopped fibers.

3. The gas diffusion layer according to claim 1, wherein a porosity of the porous member is 42% or more and 60% or less.

4. The gas diffusion layer according to claim 1, wherein the conductive particles are structured with two types of carbon materials differing in average particle size from each other.

5. The gas diffusion layer according to claim 4, wherein a mix ratio between the carbon material whose average particle size is small and the carbon material whose average particle size is great is 1:0.7 to 1:2.

6. The gas diffusion layer according to claim 1, wherein a thickness of the porous member is 150 μm or more and 600 μm or less.

7. The gas diffusion layer according to claim 6, wherein the thickness of the porous member is 300 μm or more and 600 μm or less.

8. A membrane electrode assembly comprising the gas diffusion layer according to claim 1.

9. A fuel cell comprising the gas diffusion layer according to claim 1.

10. The gas diffusion layer according to claim 1, wherein the porous member has a structure supported by the conductive particles and the polymer resin without using any carbon fiber as a base material.

11. A manufacturing method of a gas diffusion layer used for a fuel cell, comprising:
mixing conductive particles (excluding conductive particles modified with boron), a polymer resin, carbon fibers, a surfactant, and a dispersing solvent;
rolling a mixture obtained by the mixing to mold the mixture to be sheet-like;
calcining the sheet-like molded mixture to remove the surfactant and the dispersing solvent from the mixture; and
re-rolling the mixture from which the surfactant and the dispersing solvent are removed to adjust a thickness of the mixture, wherein
a mix ratio of the carbon fibers in the mixture re-rolled to have the thickness adjusted in the re-rolling is 2.0 weight percent or more and 7.5 weight percent or less, and a mix ratio of the polymer resin in the mixture re-rolled is 10 weight percent or more and 17 weight percent or less.

12. The manufacturing method of a gas diffusion layer according to claim 11, wherein one of vapor grown carbon fibers, milled fibers, cut fibers, and chopped fibers are used as the carbon fibers.

13. The manufacturing method of a gas diffusion layer according to claim 11, wherein a porosity of the mixture having the thickness adjusted by the re-rolling is 42% or more and 60% or less.

14. The manufacturing method of a gas diffusion layer according to claim 11, wherein two types of carbon materials differing in average particle size from each other are used as the conductive particles.

15. The manufacturing method of a gas diffusion layer according to claim 14, wherein a mix ratio between the carbon material whose average particle size is small and the carbon material whose average particle size is great is 1:0.7 to 1:2.

16. The manufacturing method of a gas diffusion layer according to claim 11, wherein the thickness of the mixture is adjusted to be 150 μm or more and 600 μm or less in the re-rolling of the mixture from which the surfactant and the dispersing solvent are removed.

17. The manufacturing method of a gas diffusion layer according to claim 16, wherein the thickness of the mixture is adjusted to be 300 μm or more and 600 μm or less in the re-rolling of the mixture from which the surfactant and the dispersing solvent are removed.

18. A gas diffusion layer, manufactured through the manufacturing method according to claim 11.

19. The gas diffusion layer according to claim 1, wherein a porosity of the porous member is 42% or more and 50% or less.

20. The manufacturing method of a gas diffusion layer according to claim 11, wherein a porosity of the mixture having the thickness adjusted by the re-rolling is 42% or more and 50% or less.

* * * * *